(12) United States Patent
Smith et al.

(10) Patent No.: US 9,626,183 B1
(45) Date of Patent: Apr. 18, 2017

(54) DEVICE INTERROGATION FRAMEWORK

(71) Applicant: United Services Automobile Association (USAA), San Antonio, TX (US)

(72) Inventors: Eric Smith, Helotes, TX (US); Andrew Jamison, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 14/460,850

(22) Filed: Aug. 15, 2014

(51) Int. Cl.
*G06F 9/44* (2006.01)

(52) U.S. Cl.
CPC ........................... *G06F 8/71* (2013.01)

(58) Field of Classification Search
CPC ........................................................ G06F 8/71
See application file for complete search history.

(56) References Cited

U.S. PATENT DOCUMENTS

| | | | | |
|---|---|---|---|---|
| 5,978,860 A * | 11/1999 | Chan et al. | | 710/8 |
| 2004/0245534 A1* | 12/2004 | Yamada | | 257/94 |
| 2010/0332906 A1* | 12/2010 | Agrawal | | H04L 41/0631 714/37 |
| 2011/0010698 A1* | 1/2011 | Byom et al. | | 717/168 |
| 2011/0210818 A1* | 9/2011 | Denison | | B60R 25/102 340/5.6 |
| 2011/0289497 A1* | 11/2011 | Kiaie et al. | | 717/171 |
| 2012/0030393 A1* | 2/2012 | Ganesh | | G01C 21/265 710/303 |
| 2012/0038478 A1* | 2/2012 | Haviv | | E05B 17/22 340/540 |
| 2013/0202055 A1* | 8/2013 | Caliguri et al. | | 375/260 |
| 2014/0007222 A1* | 1/2014 | Qureshi et al. | | 726/16 |
| 2014/0081662 A1* | 3/2014 | Bradrick et al. | | 705/3 |
| 2014/0095894 A1* | 4/2014 | Barton et al. | | 713/190 |
| 2014/0248852 A1* | 9/2014 | Raleigh et al. | | 455/407 |
| 2014/0370958 A1* | 12/2014 | Lutnick | | 463/17 |
| 2015/0128105 A1* | 5/2015 | Sethi | | G06F 8/36 717/106 |
| 2016/0066189 A1* | 3/2016 | Mahaffey | | G06F 21/316 455/405 |

\* cited by examiner

*Primary Examiner* — Chameli Das
(74) *Attorney, Agent, or Firm* — Brinks Gilson & Lione

(57) ABSTRACT

A system provides support for a device interrogation framework. The system may include an electronic device and an application server. The electronic device may perform a device interrogation to identify one or more device characteristics, and adaptively disable one or more application functions of a software application according to the device characteristics. For example, the electronic device may send the device characteristics to the application server, and the application server may apply a set of feature support criteria to determine particular application functions to enable or disable on the electronic device. The application server may send a compatibility determination to the electronic device specifying which application functions of the software application to disable.

20 Claims, 7 Drawing Sheets

DEVICE INTERROGATION FRAMEWORK

BACKGROUND

1. Field of the Invention

This disclosure relates to identifying characteristics of an electronic device and adaptively enabling application functions based on the identified device characteristics.

2. Description of Related Art

Rapid advances in electronics and communication technologies, driven by immense customer demand, have resulted in the widespread adoption of electronic devices. Many of these devices have sophisticated processing capability that can vary from device to device. The types, degree, and scope of variations between electronic devices are nearly limitless, and may include various permutations of differences in hardware or software elements. These vastly differing device capability and configurations may increase the difficulty in ensuring proper functioning of a software application for each of the different electronic device designs and types.

SUMMARY

The descriptions below include methods, systems, logic, circuitry, and devices for supporting device interrogation and adapting application functionality according to the device interrogation. The device interrogation framework discussed herein may provide a way for businesses to provide software to customers and prevent execution of specific software features that are unlikely to function execute properly on a particular customer device. By determining the abilities of a device and controlling the software so that only compatible features will be permitted for that device, increased user satisfaction may be achieved.

In one aspect, an electronic device may perform a method that may include the steps of initiating a software application; performing a device interrogation to identify a device characteristic of the electronic device; assessing that the device characteristic of the electronic device would affect a particular functionality of the software application; and disabling the particular functionality of the software application responsive to assessment of the device characteristic. In other embodiments, the device characteristics may be reassessed at regular intervals, or in response to certain trigger events, and previously disabled functions in the software application may be reenabled based on changes in the device characteristics over time.

In another aspect, a device may include a communication interface, a user interface, and device circuitry. The device circuitry may be configured to initiate a software application; perform a device interrogation to identify a device characteristic of the electronic device; assess that the device characteristic would affect a particular functionality of the software application; and disable the particular functionality of the software application responsive to assessment of the device characteristic.

In yet another aspect, a product may include a non-transitory computer readable medium that stores instructions. The instructions, when executed by a processor, may cause the processor to initiate a software application; perform a device interrogation to identify a device characteristic of an electronic device; assess that the device characteristic would affect a particular functionality of the software application; and disable the particular functionality of the software application responsive to assessment of the device characteristic.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The disclosure below may provide for methods, devices, processing, logic, systems, and circuitry for supporting device interrogation. Device interrogation may include assessing or measuring a device characteristic, such as a capability, configuration, or functionality of a device, whether provided by hardware or software. The disclosure below may also provide for adapting functionality of a software application according to the device interrogation, such as by inhibiting particular application functionality that a device may not adequately support or that may function improperly on the electronic device. Accordingly, the disclosure may provide for flexible support for application functionality across a diverse array of devices which vary in configuration, design, and capability.

Figure 1:
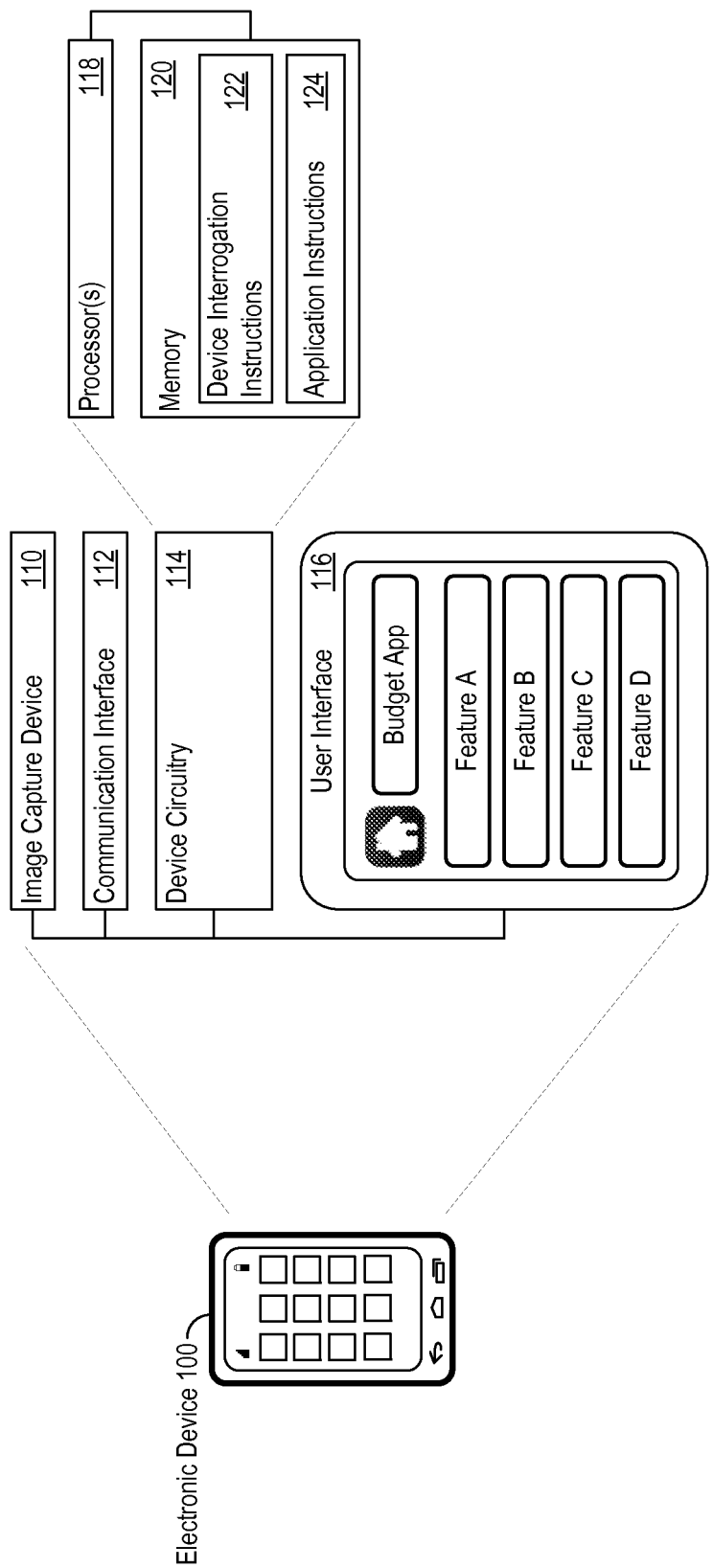
FIG. 1 shows an example of an electronic device that supports device interrogation.

FIG. 1 shows an example of an electronic device 100 that supports device interrogation. In FIG. 1, the electronic device 100 is a cellular telephone. However, the electronic device 100 may take any number of forms, including as examples, any mobile communication device, laptop or desktop computer, digital camera, personal digital assistant (PDA), tablet device, portable music player, wearable electronic device (e.g., glasses or wristwatch with electronic functionality), and others.

Various forms of the electronic device may differ in configuration and capability. For example, different electronic devices may differ in hardware components, such as processors or chipsets, memory elements, image capture capabilities, input/output (I/O) interfaces, display types, battery elements, communication interfaces, audio interfaces, sensors, and more. Electronic devices may also vary in software capability and configurations, and exemplary software differences may include differing operating systems (OS) and/or differing OS versions, custom software that may be installed by a device manufacturer, differing messaging software, e-mail software, and browsers. As such, the scope of differences between one electronic device to another may be nearly limitless, and such variance may affect functionality of an application executing across these various electronic devices.

The exemplary electronic device 100 shown in FIG. 1 includes an image capture device 110 and a communication interface 112. The image capture device 110 may support image or video capture, and in some implementations, takes the form of a digital camera. The communication interface 112 may include transceivers for wired or wireless communication. The transceivers may include modulation/demodulation circuitry, digital to analog converters (DACs), shaping tables, analog to digital converters (ADCs), filters, waveform shapers, filters, pre-amplifiers, power amplifiers and/or other circuitry for transmitting and receiving through a physical (e.g., wireline) medium such as coaxial cable, Ethernet cable, or a telephone line, or through one or more antennas. The communication interface 112 may support communication according to any number of communication standards, protocols, topologies, and networks, including Bluetooth (BT), Wireless LAN (WLAN), Near Field Communications (NFC), any number of cellular standards (e.g., 2G, 3G, Universal Mobile Telecommunications System (UMTS), GSM® Association, Long Term Evolution (LTE)™, or more), WiFi (including 802.11 a/b/g/n/ac), WiMAX, Bluetooth, WiGig, and others.

The user interface 116 may include a graphical user interface (GUI), touch sensitive display, voice or facial recognition inputs, buttons, switches, speakers and other user interface elements. The electronic device 100 may also include any number of I/O interfaces, such as microphones, video and still image cameras, temperature sensors, vibration sensors, rotation and orientation sensors, headset and microphone input/output jacks, Universal Serial Bus (USB), Serial Advanced Technology Attachment (SATA), and Peripheral Component Interconnect express (PCIe) interfaces and connectors, memory card slots, radiation sensors (e.g., IR or RF sensors), and other types of inputs. The I/O interfaces 128 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces.

The electronic device includes device circuitry 114. The device circuitry 114 is part of the implementation of any desired functionality in the electronic device 100. As discussed in greater detail below, the device circuitry 114 may support device interrogation, application compatibility determinations, and adaptive disabling of one or more application functions. In some implementations, the device circuitry 114 includes one or more processors 118 and memories 120. The memory 120 stores, for example, device interrogation instructions 122 that the processor 118 may execute to support device interrogation. The memory 120 may also store application instructions 124 that may implement a software program or application that the processor 118 may execute. In FIG. 1, the application instructions 124 may implement a budgeting application (or "app"), as shown in a GUI of the user interface 116. Additional examples of software programs include financial, banking, insurance, messaging, gaming, social networking, and countless other types of software applications the electronic device 100 may implement or execute.

In operation, the device circuitry 114 may support device interrogation by identifying one or more device characteristics of the electronic device 100 and adapt an application according to the identified device characteristics. For example, the device circuitry 114 may assess that a device characteristic of the electronic device 100 would affect a particular functionality of the application, and disable the particular functionality of the application responsive to the assessment of the device characteristic. Explained in another way, the device circuitry 114 may identify compatibility of the electronic device 100 with the application, and adaptively disable particular application functions that are incompatible with the device resources and capability of the electronic device 100

Figure 2:
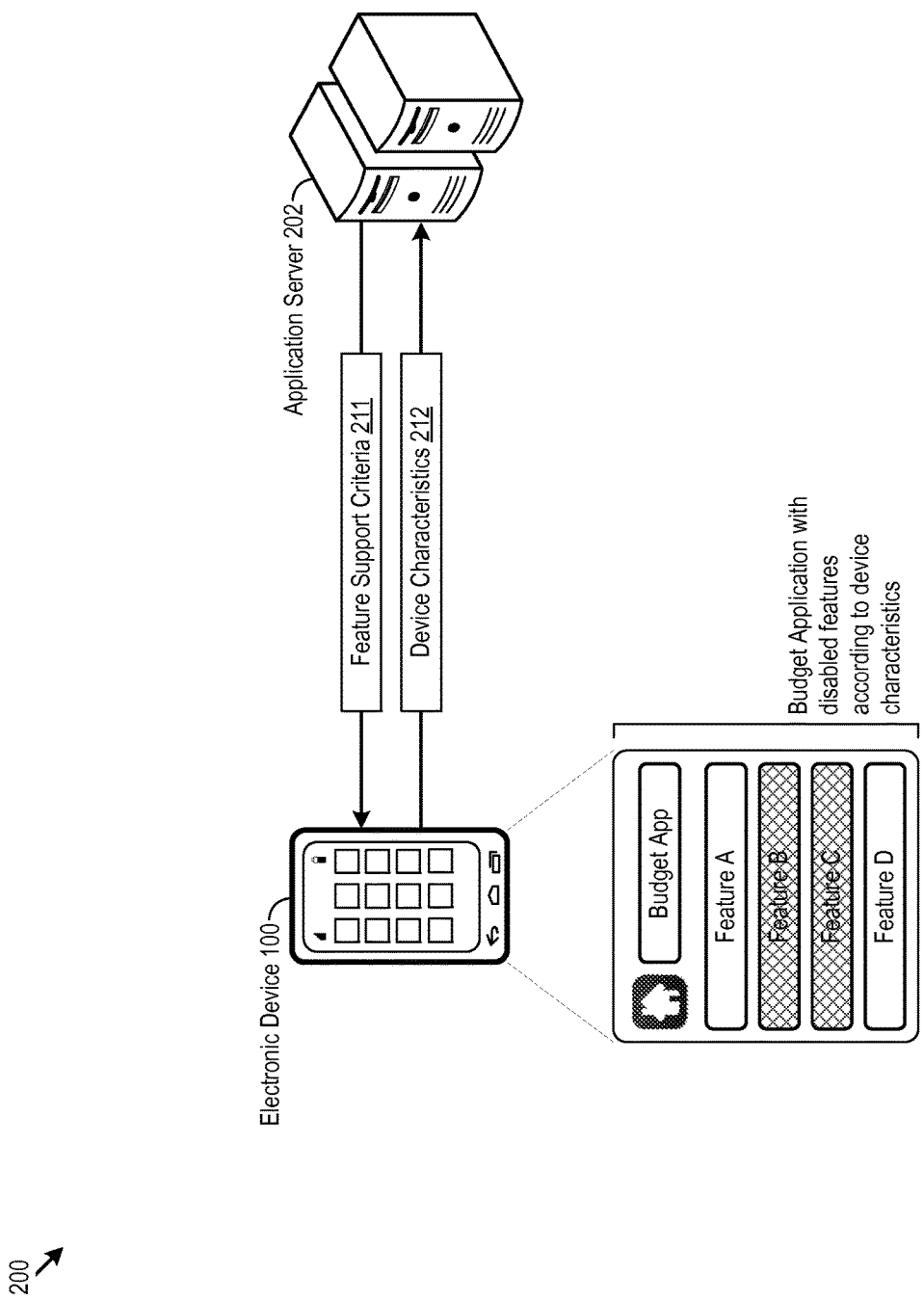
FIG. 2 shows an example of system that supports device interrogation.

FIG. 2 shows an example of system 200 that supports device interrogation. The system 200 includes the electronic device 100 and an application server 202. The electronic device 100 and the application server 202 may be communicatively linked through one or more communication networks. Optionally, the application server 202 may provide or support a software application to the electronic device 100, such as the budgeting application shown in FIG. 2. The application server 202 may additionally or alternatively provide support to the electronic device 100 for device interrogation, compatibility determinations, and adaptively enabling and disabling application functionality.

Determinations as to which functions of application to adapt according to a device interrogation may be performed by the electronic device 100, the application server 202, or both. As one option, the electronic device 100 may perform an interrogation to identify its device characteristics, and send the identified device characteristics 212 to the application server 202, for example upon initiation of the application. In this option, the application server 202 may assess the device characteristics 212 of the electronic device 100 to determine if the device characteristics 212 would adversely affect one or more application functions, and send a response as to which functions of the application to enable or disable. In other implementations, the application server 202 may provide parameters or criteria to the electronic device 100, through which the electronic device 100 may locally determine adaptations for an application according to the device interrogation and identified device characteristics.

In some variations, the application server 202 provides feature support criteria 211 to the electronic device 100. The feature support criteria 211 may include one or more criterion through which the electronic device 100 determines which functionality of the application to enable or disable. The feature support criteria 211 may specify disabling a particular functionality of an application when a device characteristic of the electronic device 100 fails to meet a particular characteristic threshold. In FIG. 2, the electronic device 100 executes a budgeting application provided by the application server 202, which may include multiple features or functionality such as those labeled as features A, B, C, and D. Responsive to the device interrogation and application of the feature support criteria 211, the electronic device 100 may disable features B and C when one or more device characteristics of the electronic device 100 fail to satisfy the feature support criteria 211 for features B and C. In some implementations, the feature support criteria 211 may specify disabling the entire application itself when one or more features are not supported or responsive to the device interrogation, e.g., as opposed to disabling a particular application function. Some examples of feature support criteria 211 are presented next.

As a first example, the feature support criteria 211 may include one or more OS version criterion. The electronic device 100 may perform a device interrogation to identify the OS installed on the electronic device, which may identify a particular version of the OS. As one illustration, the electronic device 100 may perform a device interrogation to identify a particular version of the Google® Android OS, Apple® iOS, or Microsoft® OS running on the electronic device 100. The device interrogation may also determine whether the OS executing on the electronic device 100 is specific to or has been customized by a particular device manufacturer. The OS version criterion may specify disabling particular functionality of an application or the entire application itself according to the OS type, version, and associated manufacturer, such as when the installed OS version of an electronic device 100 is a particular version or below. Differing OS versions (for example, varying versions of Google Android) may provide different capabilities to the electronic device 100, and the application (or particular function of the application) may be incompatible or unsupported by the particular OS version executing on the electronic device 100. Accordingly, the electronic device 100 may enable or disable one or more functions of the applications according to the OS version criterion.

As a second example, the feature support criteria 211 may include one or more image capture criterion, which may relate to an image capture capability of the electronic device 100. The image capture criterion may specify that the electronic device 100 include an image capture device 110 and may further specify threshold capabilities of the image capture device 110. For instance, the image capture criterion may require a threshold megapixel rating, a threshold resolution capability, or particular image processing capabilities such as support for video at a threshold frame rate, support for a particular image format, support for lighting, blur, or other image processing adjustments, as just a few examples. As additional examples, the image capture criterion may specify that the image capture device 110 include particular image sensor types or that optical circuitry in the image capture device 110 meet threshold requirements, such as a shutter speed, exposure requirements, ISO sensitivity, and more. The electronic device 100 may, for example, disable a remote check deposit or other image capture-related function of a budgeting application when the electronic device 100 fails to satisfy the image capture criterion, or in other variations, the entire application itself.

As a third example, the feature support criteria 211 may include one or more memory availability criterion. An application or particular application function may require a threshold amount of memory to function properly, and the electronic device 100 may disable a particular application function or the entire application itself when the memory availability criterion is not satisfied. The memory availability criterion may specify threshold memory availability for particular memory types, such as random access memory (RAM), cache memory, or other storage memory in the electronic device 100.

As a fourth example, the feature support criteria 211 may include one or more hardware capability criterion, which may overlap with any of the previously described examples. The hardware capability criterion may specify any criterion related to hardware of the electronic device 100. For instance, the hardware capability criterion may specify a threshold for processor availability, configuration, type, and/or speed that the electronic device 100 should satisfy before enabling particular application functionality. The hardware capability criterion may additionally or alternatively specify I/O interface thresholds, user interface capability requirements, transfer speed requirements for a wireless radio, or a required device power or remaining energy threshold for enabling a particular application function or the entire application itself, as some examples.

As a fifth example, the feature support criteria 211 may include one or more additional software criterion. The additional software criterion may specify that the electronic device 100 include one or more additional software applications or features, such as particular image processing, message, or media presentation software or features. In some variations, the additional software criterion may require that the number of concurrently executed additional applications not exceed a particular threshold, e.g., to ensure processor and/or memory availability. As other variations, the additional software criterion may require that another predetermined application, thread, or software process not be concurrently executed.

While some examples of the feature support criteria 211 have been presented above, the application server 202 may provide or apply any number of additional or alternative feature support criteria 211 to support adaptive enabling or disabling of particular application features. Accordingly, the electronic device 100 and application server 202 may support device interrogation and selective enabling of particular application function (e.g., features) or the application itself according to identified device characteristics of the electronic device 100 and one or more feature support criteria 211.

Figure 3:
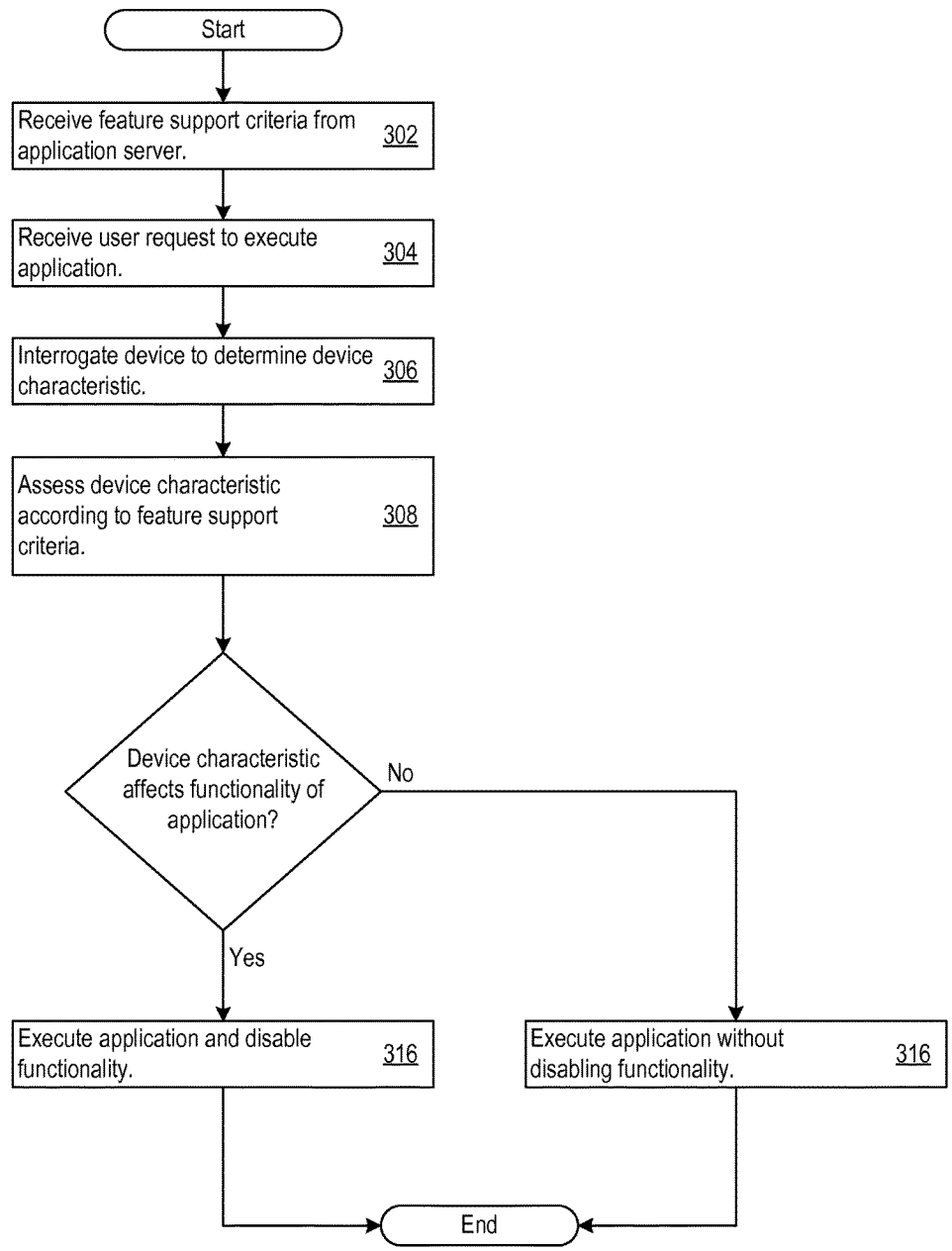
FIG. 3 shows an example of logic that may be implemented in hardware, software, or both.

FIG. 3 shows an example of logic 300 that may be implemented in hardware, software, or both. For example, the electronic device 100 may implement the logic 300 as part of the device circuitry 114, or as part of the device interrogation instructions 122 and/or application instructions 124.

The electronic device 100 may receive one or more feature support criteria 211 from an application server 202 (302). The feature support criteria 211 may be specific to a particular application, such as an application provided by the application server 202. A continuing example of such an application is the budgeting application shown in FIGS. 1 and 2, and the feature support criteria 211 may be specific to the budgeting application or particular functions of the budgeting application.

The electronic device 100 may perform a device interrogation to identify device characteristics of the electronic device 100. The electronic device 100 may perform the device interrogation in a period or aperiodic manner, and to identify a set of predetermined characteristics of the electronic device 100. As one example, the electronic device 100 may receive a user request to execute the particular application (304), and interrogate the device to determine the device characteristics in response to the initiation or start of execution of the particular application (306).

As other examples, the electronic device 100 may periodically perform the device interrogation (for example, once an hour), or in response to other interrogation triggers, for example, after the electronic device 100 exits a sleep mode, upon entering an active mode, upon verifying user authentication information, or upon successful logging in for an application. As another example of an interrogation trigger, the electronic device 100 may perform the device interrogation in response to a requested access/use of a particular application function. In this example, the electronic device 100 may limit the device interrogation to the particular device characteristics correlated to the particular application function, such as the particular device characteristics relevant to the feature support criteria 211 for the particular application function.

To illustrate, the electronic device 100 may receive a request to access a remote check deposit function of the budgeting application. The feature support criteria 211 corresponding to the remote check deposit function may include an image capture criterion and OS version criterion, but not a memory availability criteria (that is, the feature support criteria 211 may not specify a memory requirement for accessing the remote check depositing function). The electronic device 100 may perform a device interrogation in response, and specifically to identify device characteristics of the image capture device 110 and OS, but not for memory availability. In this way, the electronic device 100 may perform a targeted device interrogation specifically for device characteristics relevant to a particular application function.

Explained another way, the electronic device 100 may identify specific characteristics applicable to the feature support criteria 211. As some examples noted above, the electronic device 100 may perform a device interrogation to determine an OS version installed on the electronic device 100, current memory availability, current processor capability, image capture device 110 characteristics, or any combination thereof. Then, the electronic device 100 may assess the identified device characteristics according to the feature support criteria 211. In doing so, the electronic device 100 to assess whether the identified device characteristics would adversely affect one or more functionalities or features of the particular application, which may correlate to whether the identified device characteristics satisfy the feature support criteria 211 or not. Adverse effects may include when the device characteristics 212 would not support proper functioning of the application function, such as an incompatible OS version, lack of a particular hardware element, cause a software glitch or crash due to a missing software element, execute too slowly due to a lack or memory availability, or any other way the device characteristic may cause improper functioning of a particular application function. In some variations, the electronic device 100 determines the device characteristic would adversely affect a particular application function when the device characteristic fails to satisfy the feature support criteria 211 for the particular application function When a device characteristic satisfies the feature support criteria 211, the electronic device 100 may execute the particular application without disabling an application function corresponding to the feature support criteria 211. When the device characteristic does not satisfy the feature support criteria 211, the electronic device 100 may execute the particular application and disable the application function corresponding to the feature support criteria 211. The electronic device 100 may disable the application function by providing a visual indication that the application function is inaccessible, such as by greying out a visual indicator of the application function. Referring briefly to FIG. 2 as one example, the electronic device 100 greys out features B and C in the budgeting application, which may provide a visual indication that these application features are unavailable or incompatible with the electronic device 100. The electronic device 100 may also inhibit a particular application function by not executing associated application instructions 124 for the function or otherwise preventing access to the particular application function.

Optionally, the electronic device 100 may provide a disabling explanation, which may specify why one or more application functions have been disabled. In that regard, the electronic device 100 may present text or another visual indication specifying the feature support criteria 211 the electronic device 100 failed to satisfy. Such a message may state, for example, "The requested feature is incompatible with your current operating system version" or "The requested feature requires 1.0 Gb of available RAM, which your device does not presently have available." Or, the electronic device 100 may present a corresponding visual indication, such as an icon indicating that the image capture device 110 is unavailable. As yet another option, the electronic device 100 may provide a listing of one or more of the disabled application functions, for example upon starting execution of the application and after the device interrogation. Such a listing may provide a broader view of which application functions are enabled and disabled.

Optionally, the electronic device 100 may provide a resolution indication, which may include information or instruction to resolve the failed feature support criteria 211. The electronic device 100 may present the resolution indication visually, e.g., through the user interface 116, and the resolution indication may indicate a change to hardware, software, or both that would enable a disabled application function. The electronic device 100 may present an instruction to, for example, upgrade to a newer or different OS version, free a particular memory amount by shutting down other executing applications, and the like.

In some variations, the electronic device 100 may present the resolution indication as part of executing the particular application, such as through a pop-up or window as part of the budgeting application itself. In other variations, the electronic device 100 may present the resolution indication separate from the particular application, such as through receiving the resolution indication from the application server 202 via a messaging application different from the particular application, via e-mail, or through another communication medium.

Figure 4:
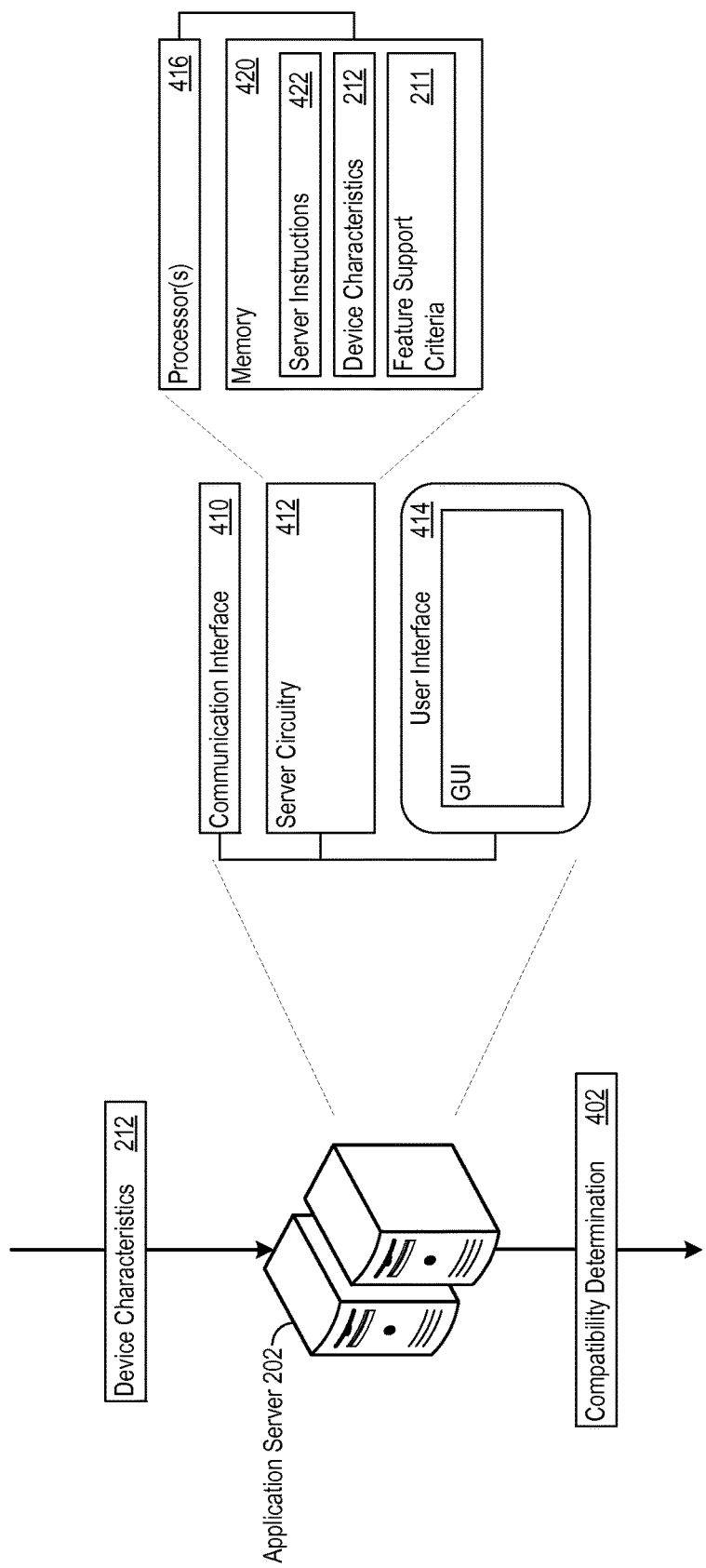
FIG. 4 shows an example of an application server that supports device interrogation.

FIG. 4 shows an example implementation of an application server 202 that supports device interrogation. In some implementations, the application server 202 may determine which application functions to enable or disable on an electronic device 100. In doing so, the application server 202 may offload processing otherwise performed by the electronic device 100 and reduce overhead, power consumption, and resource utilization of the electronic device 100. In these implementations, the application server 202 may receive device characteristics 212 identified and sent by an electronic device 100, determine which application functions to enable and/or disable according to the device characteristics 212 and feature support criteria 211, and send a compatibility determination 402 to the electronic device 100 indicating which application functions to disable, enable, or both.

The application server 202 may include a communication interface 410, server circuitry 412, and a user interface 414. The server circuitry 412 is part of the implementation of any desired functionality in the application server 202, such as the adaptive application function enabling described herein. In some implementations, the server circuitry 412 includes one or more processors 416 and memories 420. The memory 420 may store server instructions 422 which the processor 416 may execute, device characteristics 212 and the feature support criteria 211.

In operation, the application server 202 may determine compatibility of an electronic device 100 with an application and adaptively determine particular application functions to enable, disable, or both for the electronic device 100. The application server 202 may do so by applying the feature support criteria 211 to device characteristics 212 supplied by the electronic device 100, and send a compatibility determination 402 to the electronic device 100 indicating which application functions to enable and/or disable.

The application server 202 may provide support for configuring, adding, or removing any of the feature support criteria 211. For example, an administrator may access the application server 202 to update the feature support criteria 211, and updates to the feature support criteria 211 may be determined based on device characteristics 212 provided by multiple electronic devices 100. The feature support criteria 211 may specify minimal or optimal device characteristics that an electronic device 100 should include to execute the application or particular functions thereof.

The application server 202 may apply a constant set of feature support criteria 211 for a particular application or application version. Put another way, the application server 202 may provide a different set of feature support criteria 211 for different applications or different versions of a particular application. The different applications and different versions may support different functions or have different resource and capability requirements to perform the functions. Thus, the application server 202 may also receive an indication of a particular application or application version that an electronic device 100 has performed a device interrogation for, e.g., as part of the device characteristics 212.

Figure 5:
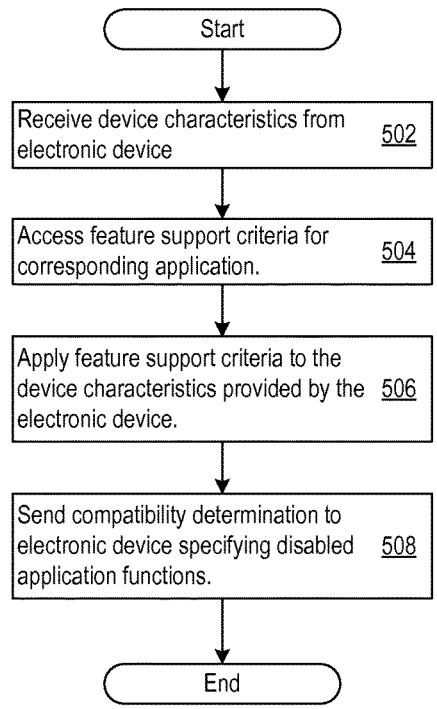
FIG. 5 shows an example of logic that may be implemented in hardware, software, or both.

FIG. 5 shows an example of logic 500 that may be implemented in hardware, software, or both. For example, the application server 202 may implement the logic 500 as part of the server circuitry 412 or as part of the server instructions 422.

The application server may receive device characteristics 212 from an electronic device 100 (502). The device characteristics 212 may specify a particular application initialized or being executed by the electronic device 100, which may optionally include an application version. The application server 202 may access feature support criteria 211 for the corresponding application and version for which the device characteristics 212 were supplied by the electronic device 100 (504). As noted above, the feature support criteria 211 may specify particular hardware and/or software requirements applicable application functions of the particular function.

The application server 202 may apply the feature support criteria 211 to the device characteristics 212 (506), and in doing so determine compatibility of the electronic device 100 with the particular application. The application server 202 may determine to disable one or more functions of the particular application. In some circumstances, the application server 202 may determine to disable the entire application itself, such as when the device characteristics 212 of the electronic device 100 do not satisfy any of the feature support criteria 211.

The application server 202 may send a compatibility determination 402 to the electronic device specifying which of the application functions to disable, if any (508). Optionally, the application server 202 may send, as part of the compatibility determination 402, a disabling explanation indicating why a particular application function was disabled. The compatibility determination 402 may additionally or alternatively include a listing of disabled application functions or a resolution indication as well, for example as described above.

Figure 6:
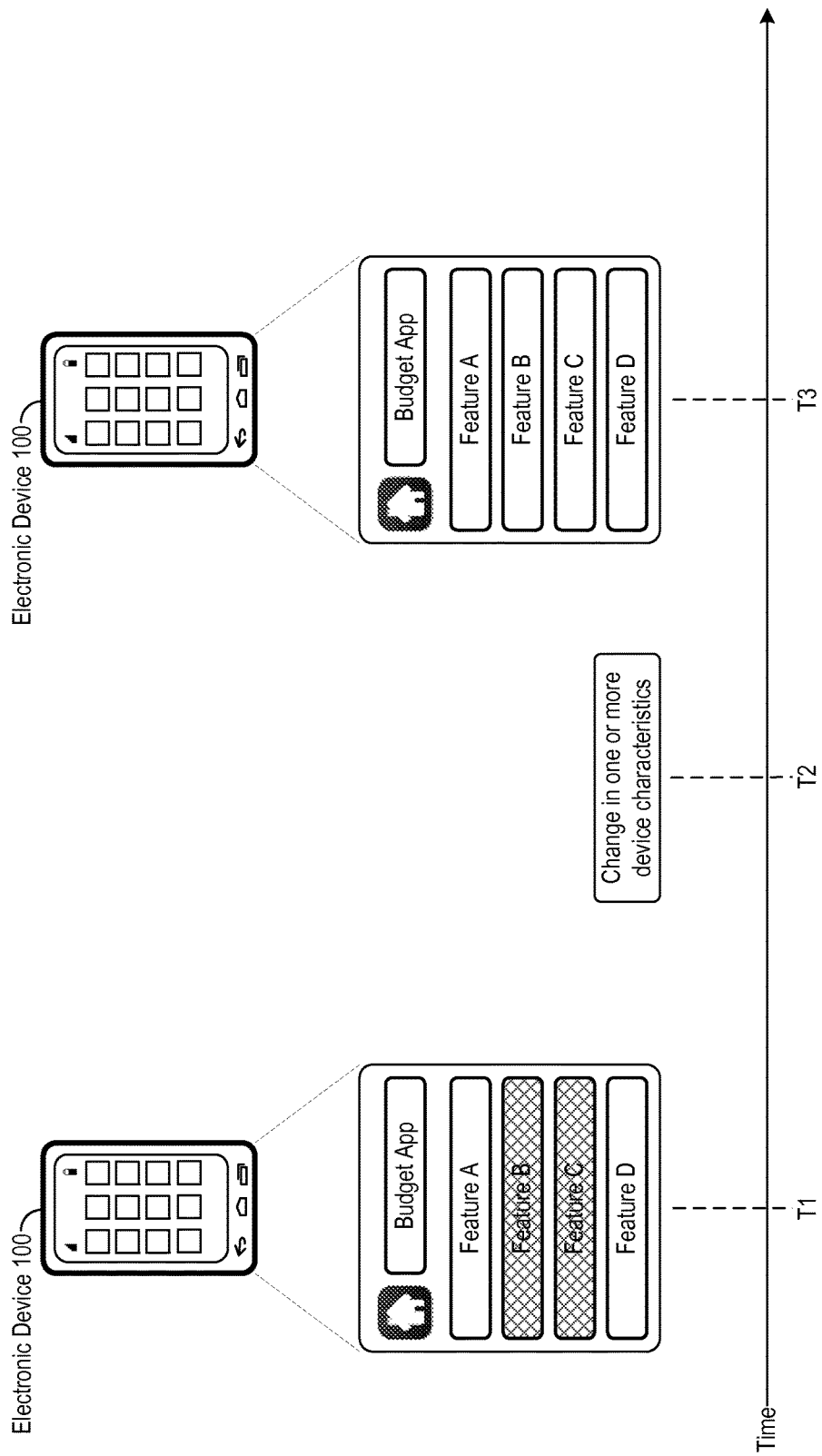
FIG. 6 shows an example of application user interfaces that an electronic device may present over time.

FIG. 6 shows an example of adaptive application function enabling and disabling that an electronic device 100 may determine over time. The resource availability of an electronic device 100 may vary over time, for example depending upon a number of currently executing applications that consume processor and memory resources. In that regard, an electronic device 100 may satisfy the feature support criteria 211 for a particular application function at one point in time, but not another. As another example, the application server 202 may adjust the feature support criteria 211 such that a particular device characteristic satisfies the feature support criteria 211 before adjustment, but fails the feature support criteria 211 after adjustment. Thus, the enabled application functionality may vary over time.

To illustrate, FIG. 6 shows functions of a budgeting application that are enabled at a time T1. The electronic device 100 may perform a device interrogation and at t time T1, the device characteristics of the electronic device 100 may satisfy the feature support criteria 211 for features A and D of the budgeting application but fail the feature support criteria 211 for features B and C. Thus, at time T1, the electronic device 100 may determine to disable features B and C of the budgeting application, whether through local determination and application of the feature support criteria 211 by the electronic device 100 itself or through receiving a compatibility determination 402 from the application server 202.

At a time T2, the device characteristics of the electronic device 100 may change. The electronic device 100 may, as examples, install a newer version of an operating system or shut down another application to increase processor and/or memory availability. The electronic device 100 may subsequently perform a device interrogation, and at time T3, the device characteristics of the electronic device 100 may satisfy the feature support criteria 211 for features A, B, C, and D. As such, the electronic device 100 may enable or allow access to each of these features. Accordingly, the enabling or availability of different application functions may vary at different times for a single electronic device 100

Figure 7:
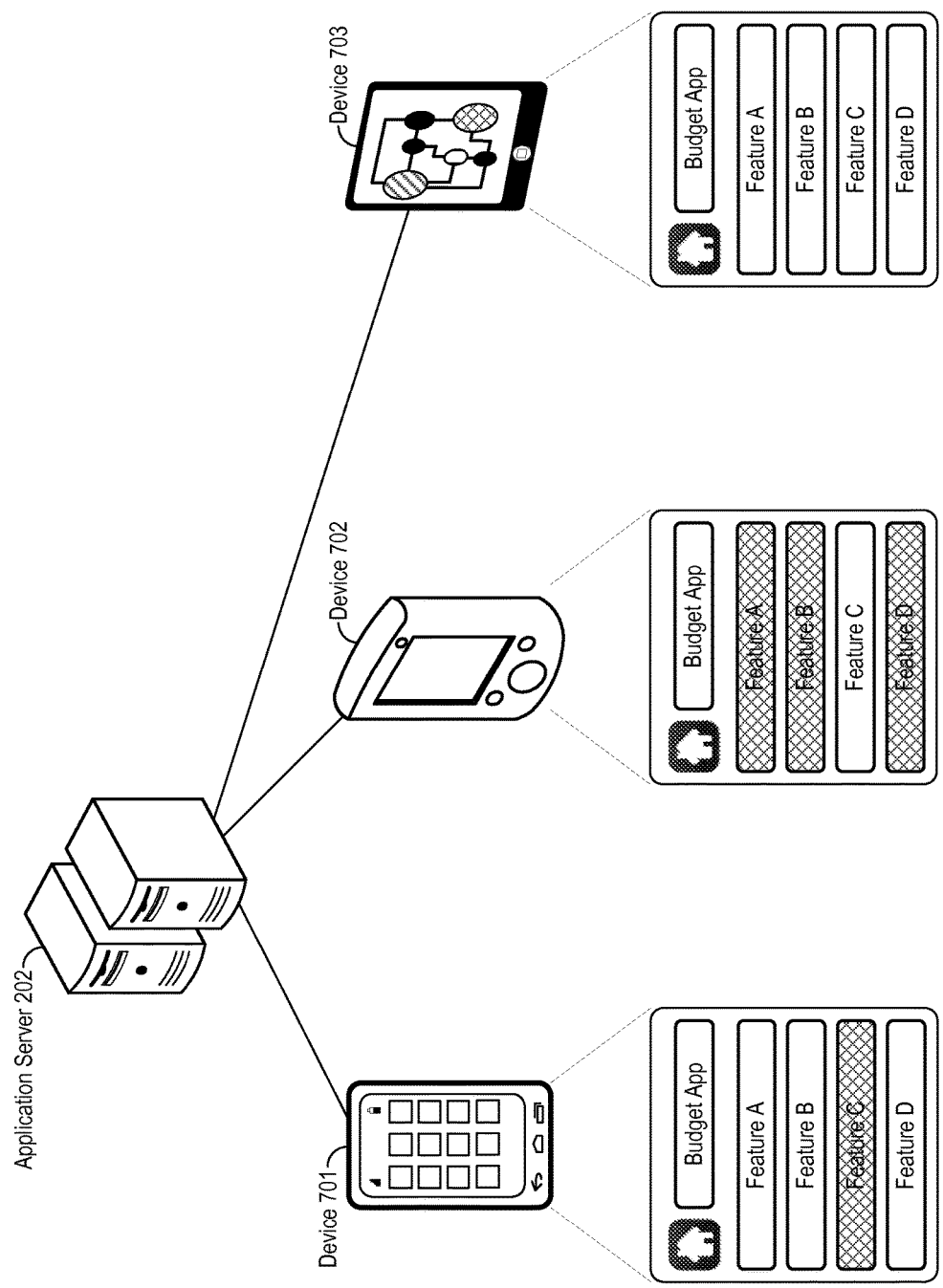
FIG. 7 shows an example of multiple devices that may support device interrogation.

FIG. 7 shows an example of multiple devices that may support device interrogation. In particular, FIG. 7 shows the electronic devices labeled as 701-703. The electronic devices 701-703 may differ in configuration, type, and capability, and the devices 701-703 may execute the same budgeting application. As seen in FIG. 7, the electronic devices 701-703 may differ in which particular functions of the budgeting application that the electronic devices 701-703 respectively enable and disable. This differentiation in application function availability may result from differing device characteristics between the devices 701-703.

The application server 202 may be in communication with the multiple, different electronic devices 701-703 varying in configuration and capability, but executing the same version of the budgeting application. The application server 202 may receive respectively identified device characteristics 212 from the electronic devices 701-703, apply a constant set of feature support criteria 211 to the different device characteristics 212, and send a respective compatibility determination 402 to the electronic devices 701-703. Thus, the different electronic devices 701-703 executing the same budgeting application (and, for instance, the same version of the budgeting application) may respectively enable/disable different application functions.

By providing a device interrogation framework for adaptively enabling or disabling application functionality, the methods, systems, devices, processing, and logic described above may provide increased flexibility in application support. The device interrogation framework may prevent access of a particular application function that is incompatible, unsupported, or would function improperly on a particular electronic device 100. Thus, the electronic device 100 may provide indications of unsupported application functionality, which may alert a user. User knowledge of unsupported functions may provide for an enhanced user experience as opposed to executing the application with improper functioning of the unsupported features. As such, the device interrogation framework may provide increased user satisfaction and ensure proper functionality of application features.

The methods, systems, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A method comprising:
   in an electronic device:
   receiving a feature support criteria request, from the software application, identifying electronic device criterion for implementing a target feature;
   initiating a software application;
   analyzing the feature support criteria request;
   determining the feature support criteria request does not include a missing electronic device criterion corresponding to a performance of an electronic device component for implementing the target feature;
   in response to determining the feature support criteria request does not include the missing electronic device criterion, performing a device interrogation to identify a device characteristic of the electronic device corresponding to the missing electronic device criterion;
   assessing whether the device characteristic of the electronic device would adversely affect a particular function of the software application; and
   disabling the particular function, while maintaining implementation of other functions of the software application, in response to an assessment that the device characteristic would adversely affect the particular function.

2. The method of claim 1, wherein assessing whether the device characteristic would adversely affect the particular function comprises:
   accessing a feature support criterion applicable to the particular function; and
   determining that the device characteristic does not satisfy the feature support criterion.

3. The method of claim 1, further comprising:
   running the software application within an operating system; and,
   disabling the particular function in response to the device characteristic being a particular version of the operating system.

4. The method of claim 1, further comprising:
   sending the device characteristic to an application server; and wherein assessing whether the device characteristic would adversely affect a particular function comprises:
   receiving a compatibility determination message from the application server specifying disabling of the particular function.

5. The method of claim 1, wherein disabling the particular function comprises presenting a visual indication through a user interface that the particular function is disabled.

6. The method of claim 1, further comprising presenting a disabling explanation via the user interface indicating why the particular function has been disabled.

7. The method of claim 1, further comprising presenting a resolution indication specifying an instruction of how to enable the particular function.

8. An electronic device comprising:
   a communication interface;
   a user interface; and
   device circuitry configured to:
   receive a feature support criteria request, from the software application, identifying electronic device criterion for implementing a target feature;
   initiate a software application;
   analyze the feature support criteria request;
   determine the feature support criteria request does not include a missing electronic device criterion corresponding to a performance of an electronic device component for implementing the target feature;
   in response to determining the feature support criteria request does not include the missing electronic device criterion, perform a device interrogation to identify a device characteristic of the electronic device;
   determine whether the device characteristic would adversely affect a particular function of the software application; and
   disable the particular function, while maintaining implementation of other functions of the software application, in response to determining that the device characteristic would adversely affect the particular function.

9. The device of claim 8, wherein the device circuitry is configured to assess whether the device characteristic would adversely affect the particular function by:
- accessing a feature support criterion applicable to the particular function; and
- determining that the device characteristic does not satisfy the feature support criterion.

10. The device of claim 8, wherein the device circuitry is configured to initiate the software application within an operating system; and,
- disable the particular function in response to the device characteristic being a particular version of the operating system.

11. The device of claim 8, wherein the device circuitry is further configured to:
- send the device characteristic through the communication interface to an application server; and
- wherein the device circuitry is configured to assess whether the device characteristic would adversely affect a particular function by: receiving, through the communication interface, a compatibility determination message from the application server specifying disabling of the particular function.

12. The device of claim 8, wherein the device circuitry is configured to disable the particular function by:
- presenting, through the user interface, a visual indication that the particular function is disabled.

13. The device of claim 8, wherein the device circuitry is further configured to presenting, through the user interface, a disabling explanation indicating why the particular function has been disabled.

14. The device of claim 8, wherein the device circuitry is further configured to present, through the user interface, a resolution indication specifying an instruction of how to enable the particular function.

15. A product comprising:
- a non-transitory computer readable medium storing instructions that, when executed by a processor, cause the processor to:
- receive a feature support criteria request, from the software application, identifying electronic device criterion for implementing a target feature;
- initiate a software application;
- determine the feature support criteria request does not include a missing electronic device criterion corresponding to a performance of an electronic device component for implementing the target feature;
- in response to determining the feature support criteria request does not include the missing electronic device criterion, perform a device interrogation to identify a device characteristic of an electronic device;
- assess whether the device characteristic would adversely affect a particular function of the software application; and
- disable the particular function, while maintaining implementation of other functions of the software application, in response to determining that the device characteristic would adversely affect the particular function.

16. The product of claim 15, wherein the instructions causes the processor to assess whether the device characteristic would adversely affect a particular function by:
- accessing a feature support criterion applicable to the particular function; and
- determining that the device characteristic does not satisfy the feature support criterion.

17. The product of claim 15, further comprising:
- running the software application within an operating system; and,
- disabling the particular function in response to the device characteristic being a particular version of the operating system.

18. The product of claim 15, wherein the instructions further cause the processor to:
- send the device characteristic to an application server; and
- wherein the instructions cause the processor to assess that the device characteristic would adversely affect the particular function by: receiving a compatibility determination message from the
- application server specifying disabling of the particular function.

19. The product of claim 15, wherein the instructions cause the processor to disable the particular function of the application by: presenting, through a user interface, a visual indication that the particular function is disabled.

20. The product of claim 15, wherein the instructions further cause the processor to:
- present, through a user interface, a disabling explanation indicating why the particular function has been disabled.

* * * * *